(12) United States Patent
Deppe et al.

(10) Patent No.: US 8,419,189 B1
(45) Date of Patent: Apr. 16, 2013

(54) EMISSIVE FIBERS CONTAINING UP CONVERTERS EXCITED BY GAAS BASED SEMICONDUCTOR LIGHT SOURCES

(75) Inventors: Dennis G. Deppe, Oviedo, FL (US); Michael Bass, Indian River Shores, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 438 days.

(21) Appl. No.: 12/784,594

(22) Filed: May 21, 2010

Related U.S. Application Data (63) Continuation-in-part of application No. 12/365,971, filed on Feb. 5, 2009, and a continuation-in-part of application No. 12/349,712, filed on Jan. 7, 2009, and a continuation-in-part of application No. 12/124,234, filed on May 21, 2008, now Pat. No. 7,899,093, and a continuation-in-part of application No. 12/124,620, filed on May 21, 2008, now Pat. No. 7,804,640, and a continuation-in-part of application No. 11/758,435, filed on Jun. 5, 2007, now Pat. No. 7,471, 706.

(60) Provisional application No. 61/180,475, filed on May 22, 2009, provisional application No. 61/026,827, filed on Feb. 7, 2008, provisional application No. 61/019,687, filed on Jan. 8, 2008, provisional application No. 60/939, 924, filed on May 24, 2007, provisional application No. 60/939,956, filed on May 24, 2007, provisional application No. 60/811,969, filed on Jun. 7, 2006.

(51) Int. Cl.
*G03B 21/28* (2006.01)
*G03B 21/14* (2006.01)

(52) U.S. Cl.
USPC .................................... 353/31; 359/326

(58) Field of Classification Search .......... 353/31; 359/326
See application file for complete search history.

(56) References Cited

U.S. PATENT DOCUMENTS 5,089,860 A 2/1992 Deppe
6,327,074 B1 12/2001 Bass
(Continued)

OTHER PUBLICATIONS

Rapaport, et al., Review of the Properties of Up-Conversion Phosphorous for New Emissive Displays, J. of Display Technology, 2006, pp. 68-78, vol. 2 (abstract).

*Primary Examiner* — Seung C Sohn
(74) *Attorney, Agent, or Firm* — Brian S. Steinberger; Phyllis K. Wood; Law Offices of Brian S. Steinberger, P.A.

(57) ABSTRACT

Methods and systems for an emissive fiber capable of being used for making emissive fabric by providing an optical fiber having a core and and embedding up conversion particles into at least one of the cladding and core to produce an emissive fiber that emits visible light when excited by light from near infrared light source that excites the up conversion particles. The optical fiber can have a core index of refraction that is greater than or less than the refractive index of the cladding for near infrared light or an index difference between the core and cladding of zero. Plural optical fibers are intertwined to produce an emissive fabric, wherein coupling a light source with the emissive fibers transmits a light beam through the fiber to excite the up conversion particles to emit visible light. The up conversion material can be embedded into the core, the cladding, or both.

33 Claims, 9 Drawing Sheets

U.S. PATENT DOCUMENTS

| | | |
|---|---|---|
| 6,501,590 B2 | 12/2002 | Bass |
| 6,654,161 B2 | 11/2003 | Bass |
| 6,844,387 B2 | 1/2005 | Bass |
| 6,897,999 B1 | 5/2005 | Bass |
| 7,075,707 B1 | 7/2006 | Rapaport |
| 7,471,706 B2 | 12/2008 | Bass |
| 2010/0062251 A1 * | 3/2010 | Merchant et al. ............ 428/374 |

* cited by examiner

EMISSIVE FIBERS CONTAINING UP CONVERTERS EXCITED BY GAAS BASED SEMICONDUCTOR LIGHT SOURCES

This application is a continuation-in-part of U.S. patent application Ser. No. 12/365,971 filed on Feb. 5, 2009, 12/349,712 filed on Jan. 7, 2009, which is a continuation-in-part of application Ser. No. 12/124,234 filed on May 21, 2008, application Ser. No. 12/124,620 filed on May 21, 2008 and Ser. No. 11/758,435 filed on Jun. 5, 2007, now U.S. Pat. No. 7,471,706 issued on Dec. 30, 2008 which claimed the benefit of priority to U.S. Provisional application Nos. 61/026,827 filed on Feb. 7, 2008, 61/019,687 filed on Jan. 8, 2008, 60/939,924 filed on May 24, 2007, 60/939,956 filed on May 24, 2007 and 60/811,969 filed on Jun. 7, 2006, respectively, and claims the benefit of priority to U.S. Provisional Application No. 61/180,475 filed on May 22, 2009.

FIELD OF THE INVENTION

This invention relates to up converters and, in particular, to methods and systems for emissive fibers containing up converters excited by GaAs based semiconductor light sources enabling emissive cloth powered by 1.5 V of drive voltage enabling the use of small lightweight batteries for safety gear, uniforms, costumes, novelty clothing, toys, and a wide variety of identification applications and enables almost any color in the range of human color vision capability and requires only.

BACKGROUND AND PRIOR ART

Up-conversion references that are the work of at least one of the co-inventors includes U.S. Pat. No. 5,089,860 issued to Deppe et al. on Feb. 18, 1992. This patent describes a quantum well device with control of spontaneous photon emission and method of manufacturing, wherein spontaneous photon emission intensity in a semiconductor quantum well is strongly influenced by a highly reflecting interface with the quantum well interface spacing being less than the optical emission wavelength of the quantum well.

Other patents describing the inventor's work in the field of up-conversion includes U.S. Pat. Nos. 6,327,074 and 6,501,590 issued to Bass et al. respectively on Dec. 4, 2001 and Dec. 31, 2002, which are assigned to the same assignee as the subject invention. The Bass patents describe display mediums using emitting particles that are dispersed in a transparent host. The two and three dimensional color image displays include a display medium having a substantially uniform dispersion of red, green and blue visible light emitting particles sized between approximately 0.5 to approximately 50 microns therethrough. The particles can be dye doped polymethylmethacrylate (pmma) plastic, and the display medium can be pmma, acrylic plastic or glass. Other particles can be used such as rare earth doped crystals. The two dimensional display uses three laser sources each having different wavelengths that direct light beams to each of three different types of particle in the display medium. Light is absorbed by the particles which then become excited and emit visible fluorescence. Modulators, scanners and lens can be used to move and focus the laser beams to different pixels in order to form the two dimensional images having different visible colors.

Another patent describing the inventor's work in the field of up-conversion includes U.S. Pat. No. 6,654,161 issued to Bass et al. on Nov. 25, 2003, which is also assigned to the same assignee as the subject invention describes dispersed crystallite up-conversion displays based on up conversion of near infrared light to visible light. The display medium is a transparent polymer containing particles of crystals doped with $Yb^{3+}$ and other rare earth ions. The $Yb^{3+}$ ions absorb light from a commercially available diode laser emitting near 975 nm and transfers that energy to the other dopant ions. Using a fluoride crystal host, $NaYF_4$, co-doped with $Tm^{3+}$ ions blue light at about 480 nm was obtained, with $Ho^{3+}$ or $Er^{3+}$ ions green light at about 550 nm is obtained and with $Er^{3+}$ red light at about 660 nm is obtained. The display medium can be used with applications for full color, high brightness, high resolution, displays.

U.S. Pat. No. 6,844,387 issued to Bass et al. on Jan. 18, 2005 is another patent describing the inventor's own work, which is also assigned to the same assignee as the subject invention describes composites of inorganic luminophores stabilized in polymer hosts. The two and three dimensional display medium can have a novel transparent polymer composite containing particles of crystals doped with $Yb^{3+}$ and other rare earth ions. The polymer composite creates homogeneously dispersed compositions without cracking or delamination of the film and can be used for various optical applications.

U.S. Pat. No. 6,897,999 issued to Bass et al. on May 24, 2005 is another patent describing the inventor's own work and having the same assignee as that of the subject invention discloses an optically written display. The two, three dimensional color displays can include uniform dispersion of red, green and blue visible light emitting micron particles. Pumping at approximately 976 nm can generate green and red colors having an approximately 4% limit efficiency. One light source can generate three colors with a low limit efficiency. Modulators, scanners and lens can move and focus laser beams to different pixels forming two dimensional color images. Displays can be formed from near infrared source beams that are simultaneously split and modulated with micro electro mechanical systems, spatial light modulators, liquid crystal displays, digital micro mirrors, digital light projectors, grating light valves, liquid crystal silicon devices, polysilicon LCDs, electron beam written SLMs, and electrically switchable Bragg gratings. Pixels containing Yb,Tm:YLF can emit blue light. Pixels containing Yb,Er(NYF) can emit green light, and pixels containing Yb,Er:KYF and Yb,Ef:$YF_3$ can emit red light.

The concept of frequency up-conversion (UC) of infrared-to-visible light in rare-earth (RE) doped materials was reported more than forty years ago for the first time. The efficiency that was observed or expected for this process was low in singly doped media. It was quickly noticed that up-conversion could be made one or two orders of magnitude more efficient by using ytterbium (Yb) as a sensitizer ion in addition to the active ion: erbium (Er), holmium (Ho), or thulium (Tm).

In years past, efficient up-conversion materials were investigated, for photonic applications, such as in UC lasers (visible lasers that are pumped by infrared diode lasers), or in display applications. However, because no powerful source existed in the 980-nm region in order to excite those up-converters, no practical product came out of the research. With the development of powerful 980-nm diode lasers lead by the telecommunication industry, there can now be legitimate practical applications.

The prior art on the subject included pumping conditions that caused heating of the material and higher efficiencies were obtained with low duty cycle excitation. It was also reported that for the same average input power, higher efficiencies were expected in pulsed excitation mode rather than in continuous wave excitation due to the quadratic nature of the process.

The effect of the pumping conditions for display applications of up conversion materials needs to be understood, as several technologies might be used to form the image. The infrared source can either be scanned (vector-addressed or raster-scan), or the image can be directly projected using Digital Micromirror Devices (MEMS) such as in the Texas Instrument Digital Light Processing (DLP.TM.) technology. In the latter case the materials would be undergoing pulse-excitation, whereas they would be quasi-continuously excited in the second case.

U.S. Pat. No. 7,075,707 issued to Rapaport et al. on Jul. 11, 2006, to the same assignee as that of the subject invention, describes a substrate design for optimized performance of up-conversion phosphors utilizing proper thermal management. The patent describes methods and compositions for using an up-conversion phosphor as an emitting material in a reflective display and polymer compositions for display mediums, and red, green, blue (RGB) display mediums. Roles of the pumping duration and character on the temperature and the efficiency of the up-conversion process in (Ytterbium, Erbium or Thulium) co-doped fluoride crystals are also described. A problem with prior art up-conversion devices is limited efficiency since much of the incident pump light is back scattered by the up-converting particles and does not get used to generate visible light.

"Review of the properties of Up-Conversion Phosphors for new Emissive Displays" Alexandra Rapaport, Janet Milliez, Michael Bass, Arlete Cassanho, and Hans Jenssen, Invited Review article in IEEE J. of Display Technology 2, pp. 68-78, March 2006

U.S. Pat. No. 7,471,706 titled "High resolution, full color, high brightness fully integrated light emitting devices and displays" issued on Dec. 30, 2008 to co-inventors Michael Bass and Dennis G. Deppe" describes a light emitting device that includes a substrate, at least one semiconductor light emitting device formed in or on the substrate, and upconverting material disposed in or on the substrate. The upconverting material is disposed in a path of light processed or emitted by the semiconductor device. The upconverting material absorbs light emitted by the semiconductor device and emits upconverted light in response. Integrated pixelated displays include a plurality of pixels formed on a surface of the substrate, with each pixel including up-conversion material based red light source, a blue light source a green light source, and a structure for selectively controlling emission from the red, blue and green lights sources for each of the pixels.

Recently filed U.S. patent application Ser. No. 12/349,712 filed on Jan. 7, 2009 describing the work of the co-inventors describes methods and systems for a combination of up converters and semiconductor light sources in low voltage display or indicator system. The display or indicator system includes one or more spatial light modulators and one or more up converters in combination with one or more semiconductor light sources.

U.S. patent application Ser. No. 12/124,620 filed May 22, 2008 titled "Composite cavity for enhanced efficiency of up conversion" and Ser. No. 12/124,234 filed on May 22, 2008 titled "Combination of up converting materials with oxide confined semiconductor light sources" , also work of the co-inventors, describe methods, apparatus and systems for an up-converter resonant cavity light emitting diode device includes a semiconductor light source, an up-converter to form the light emitter with up-converting materials and an electrical source coupled with the semiconductor light source for providing electrical energy to the semiconductor light source to provide a desired wavelength emitted light. The semiconductor light source is a resonant cavity light emitting diode or laser that emits an approximately 975 nm wavelength to provide electrical and optical confinement to the semiconductor light source to form a resonant cavity up-converting light emitting diode.

U.S. patent application Ser. No. 12/365,971 filed by the co-inventors on Feb. 5, 2008 describes light sources using up converters to generate visible light in which the infrared light excitation is confined in a waveguide like structure.

Prior art employs visible LEDs directed into fibers in which scatterers have been placed to divert some of the light towards the viewer. Only one color can be generated and only where the scattering item is located. The range of colors available is limited to that available to visible LEDs and the shorter wavelengths (blue, green and yellow) require operation at 4 V necessitating expensive, large and heavy battery packs.

SUMMARY OF THE INVENTION

A primary objective of the invention is to provide methods and systems for emissive fibers containing up converters excited by GaAs based semiconductor light sources.

A secondary objective of the invention is to provide methods and systems for light sources using up converters to generate visible light in which the infrared light excitation is confined in a waveguide like structure.

A third objective of the invention is to provide methods and systems that enable full color emissive fibers and consequently cloth using up converters in optical fibers and low voltage GaAs semiconductor light sources to excite the visible emission. This is the only emissive fiber that is emissive uniformly along a length of fiber, can produce more than one color along its length, can produce any color in a huge color gamut and operates at less than 1.5 V.

A fourth objective of the invention is to provide methods and systems for emissive and reflective safety gear for first responders, outdoor activities and children. Team uniforms, costumes, novelty clothing, home furnishings, toys and other specialty uses of emissive cloth. It may even stimulate a new art form.

A fifth objective of the invention is to provide methods and systems for A new type of emissive fiber is described enabling emissive cloth for safety gear, uniforms, costumes, novelty clothing, toys, and a wide variety of identification applications. The new type of fiber enables almost any color in the range of human color vision capability and requires only 1.5 V of drive voltage enabling the use of small lightweight batteries.

A first embodiment provides a method of producing an emissive fiber capable of being used for making emissive fabric by providing an optical fiber having a core and a cladding surrounding the core and embedding an up conversion particles into at least one of the cladding and the core of the optical fiber to produce an emissive fiber that emits visible light when excited by light from near infrared light source that excites the up conversion particles to emit the visible light along a length of the optical fiber. The optical fiber can have a core index of refraction for near infrared light that is greater than the refractive index of the cladding for near infrared light as an index guided fiber; a core index of refraction for near infrared light that is less than the refractive index of the cladding for near infrared light as an index anti-guided fiber; an index difference between the core and the cladding that is approximately zero; and have a refractive index difference between the cladding and air of approximately 0.5 for a numerical aperture fiber capable of coupling light. The optical fiber includes a glass core and the up conversion particles embedded in a polymer clad on the glass core. The embedding step can include embedding the up conversion particles at different locations along the length of the optical fiber cladding; embedding up conversion particles to emit a different colors of visible light along the length of the optical fiber cladding; mixing one or more of a red, a green and a blue up conversion particles and embedding the mixed up conversion particles to emit a selected color of visible light. The up conversion particles can be excited by a GaAs based semiconductor light source or a resonant cavity light emitting diode. The thickness of the cladding of the optical fiber can be varied to control the absorbed power along the length of the optical fiber.

A second embodiment provides an emissive fabric that includes plural optical fibers each having a cladding and a core and up conversion particles embedded into at least one of c cladding and a core of the plural optical fibers to form an emissive fiber, the plural optical fibers intertwined to produce an emissive fabric, wherein coupling a light source with the emissive fibers transmits a light beam through the fiber to excite the up conversion particles to emit visible light. The up conversion material can be embedded into the core, the cladding of the emissive fiber, or both the core and the cladding and the up conversion particles can be one or more of red, green and a blue up conversion material different up conversion materials can be embedded into different sections along the length of the optical fiber to use in forming an emissive material to produce different colors in different parts of the emissive fabric. In an embodiment, the red up conversion particles are approximately 1% Er and approximately 18% Yb:YF$_3$ for an efficient red light emitter, the green up conversion particles are approximately 1% Er and approximately 18% Yb:NaYF$_4$ produces green light and the blue up conversion particles are approximately 0.4% Tm and approximately 20% Yb:KY$_3$F$_{10}$ to emits blue light.

A third embodiment provides a system to illuminate an emissive fabric including plural optical fibers having an up conversion material embedded into at least one of a cladding and a core of the plural optical fibers forming an emissive fabric, and a light source coupled with the plural optical fibers for producing a light beam, the light beam transmitted through the plural emissive optical fibers.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Prior up-conversion patents include U.S. Pat. No. 5,089,860 issued to Deppe et al. on Feb. 18, 1992, U.S. Pat. Nos. 6,327,074 and 6,501,590 issued to Bass et al. respectively on Dec. 4, 2001 and Dec. 31, 2002, U.S. Pat. No. 6,654,161 issued to Bass et al. on Nov. 25, 2003, U.S. Pat. No. 6,844,387 issued to Bass et al. on Jan. 18, 2005, U.S. Pat. No. 7,075,707 issued to Rapaport et al. on Jul. 11, 2006 and U.S. Pat. No. 7,471,706 issued on Dec. 30, 2008 having a common inventor and assigned to the same assignee as the subject invention are incorporated herein by reference hereto.

U.S. patent application Ser. Nos. 12/365,971 filed on Feb. 5, 2008; Ser. Nos. 12/124,620 and 12/124,234 filed on May 21, 2008 and Ser. No. 12/349,712 filed on Jan. 7, 2009 each having a common inventor and which are assigned to the same assignee as the subject invention, are also incorporated herein by reference hereto.

Figure 1:
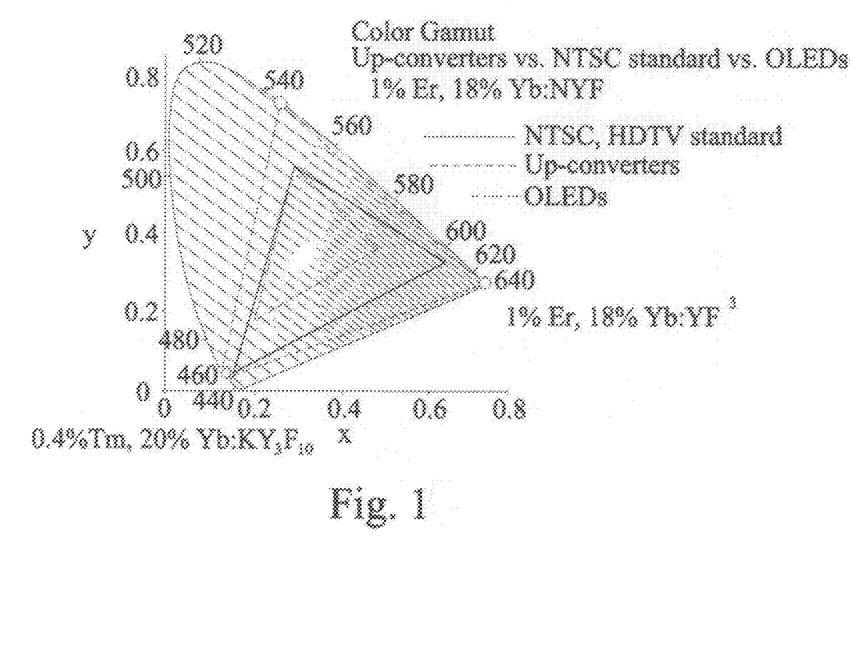
FIG. 1 shows differences between the color gamut of up-converters according to the present invention (dashed line), NTSB standards (solid line) and organic light emitting diodes (dot-dash line).

Up converters in combinations with semiconductor light sources as described in these earlier patents and pending patent applications that are incorporated herein by reference, are capable of producing the red, green and blue light needed to make a full color display with and extremely large color gamut as shown in FIG. 1.

Important properties of the up-conversion materials include the efficiency temperature dependence and the critical role of scattering of the pump light in powder-binder combination. When these properties are accounted for, approximately 1% Er, 18% Yb:YF3 are found to be an efficient red light emitter with photometric efficiency of approximately 5 lm/W, approximately 1% Er, 18% Yb:NaYF4 produces green light with photometric efficiency of approximately 52 lm/W and approximately 0.4% Tm, 20% Yb:KY3F10 emits blue light with photometric efficiency of approximately 4.2 lm/W. These particular materials are not only the most efficient found so far, their efficient excitation by the same type of light sources at approximately 975 nm enables dense integration for high-resolution display chips. In addition, the color gamut is significantly larger than that used in conventional television displays since the red, green and blue colors are highly saturated and quite pure as shown in FIG. 1.

The methods and systems of present invention provides configurations of these up converters in optical fibers such that light from near infrared GaAs based semiconductor light sources can excite the up converters to emit visible light along the length of the fiber. These emissive fibers having up conversion materials can be used to make emissive garments for use in safety clothing, uniforms, costumes, novelty clothing, home decorations and many other types of cloth based products.

The fibers can be designed such that the core index of refraction for the near infrared light is greater than that of the cladding in what is called an index guided design or such that the core index of refraction is less than that of the cladding in what is called an index anti guided design. The best efficiency and uniformity are achieved when the index difference between the core and the cladding is near zero. However, alternative core and cladding combinations or index difference can be substituted. A preferred system is one in which the core is glass and the up converters are embedded in a polymeric cladding (see the green emitting fiber in the photos) since the polymer can be mixed with the particles prior to cladding the core and the temperature of the polymer when it is clad to the core can be low enough not to damage the up converters.

Figure 9:
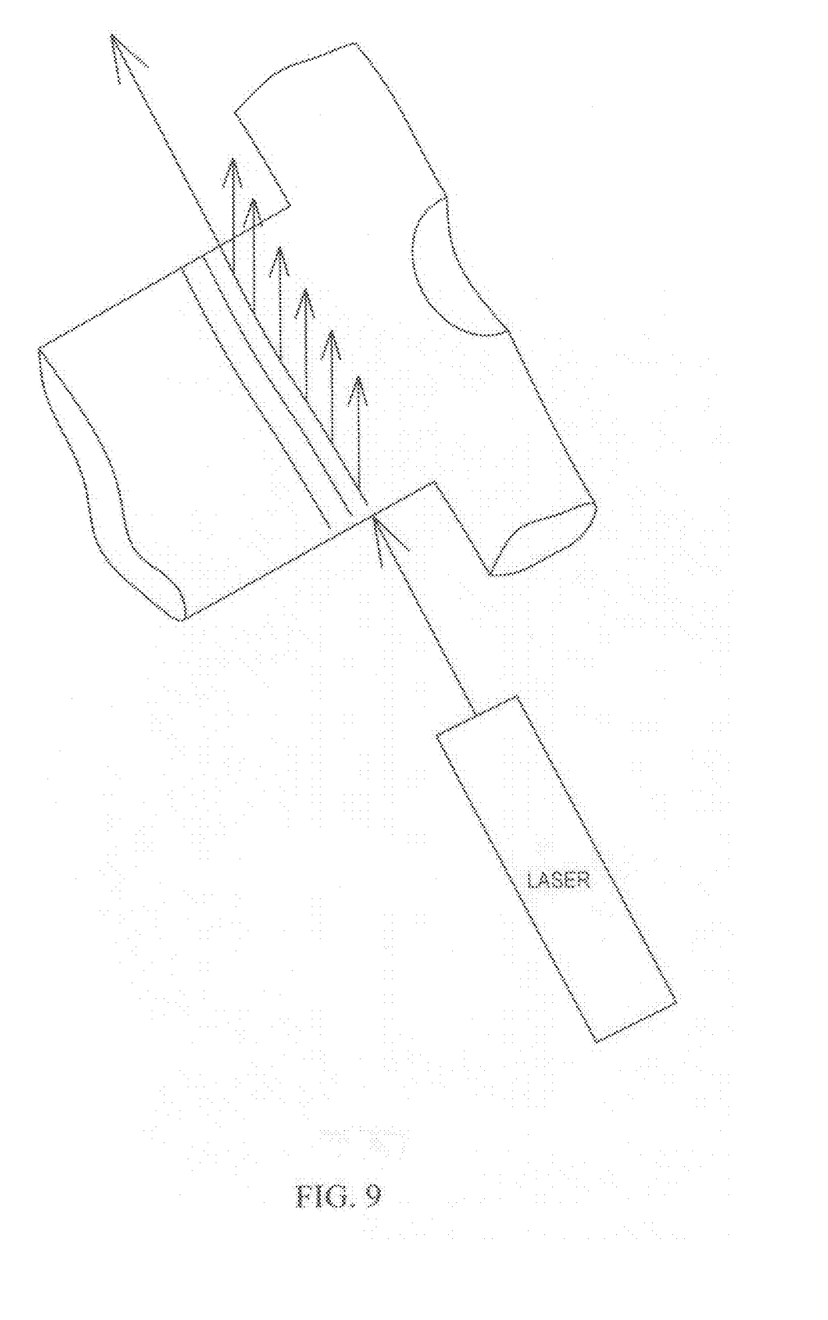
FIG. 9 shows a garment having emissive fibers with up converting particles in the cladding layer of a glass core fiber and excited by light from a laser to excite the up converter material to emit visible light according to the present invention.

FIG. 9 shows an example of a garment having emissive fibers with up converting particles in the cladding layer of a glass core fiber and excited by light from a laser to excite the up converter material to emit visible light according to the present invention.

The up converting particles of materials described in earlier patents by the inventors of the present invention can be placed either in the core or in the cladding or in both parts of the fiber. By placing the up converting particles at different locations along the length of the fiber, different parts of the fiber can be made to emit or not emit and different parts of the same fiber can be made to emit different colors. By mixing the up converters (e.g., some red and some blue or some red and some green emitters and so on) one can prepare an up converting material that will make the fiber into which it is placed emit any color that lies within the color gamut defined by the primary colors of the red, green and blue up converters previously described by the authors in co-pending patent application and shown in FIG. 1.

In order to create a fiber optimized for injection efficiency, absorption of pump light, and linear uniformity of up converted light emission, a model pump light source first needed to be created. The most economical way to pump a fiber with significant pump light at a narrowly selected wavelength was determined to be the use of a resonant cavity light emitting diode (RCLED). A model source in ASAP was created using an angular emission spectrum based on the measured angular spectrum of a visible RCLED that was described by P. N. Sravrinou, M. Whitehead, G. Parry, and C. C. Button, "Angular spectrum of visible resonant cavity light-emitting diodes", Journal of Applied Physics, Vol. 86, 82, 1999.

Figure 2:
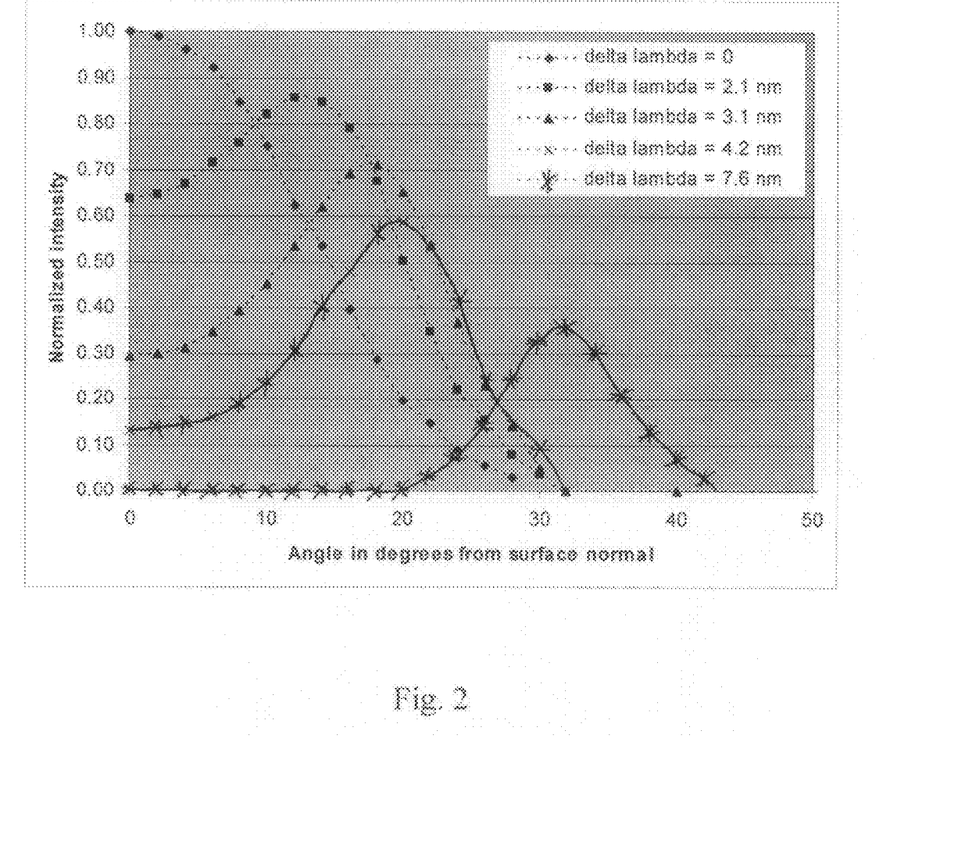
FIG. 2 is graph showing the angular radiation pattern of typical RCLED at multiple delta lambdas from the peak emission wavelength.

The properly tuned RCLED has maximum emission on axis at the peak emission wavelength, however, emission at wavelengths shifted up or down from the peak wavelength exhibit peak emission off axis, with the angle of departure from the normal axis of the device of the peak emission for a given wavelength increasing as the shift in wavelength from the peak emission wavelength increases. FIG. 2 shows a plot of the angular radiation pattern at the peak wavelength and a few random nearby wavelengths based on patterns measured in Sravrinou (1999). The greater delta lambda results in the peak emission angle shift further from the axis and a reduction in overall output intensity.

Figure 3:
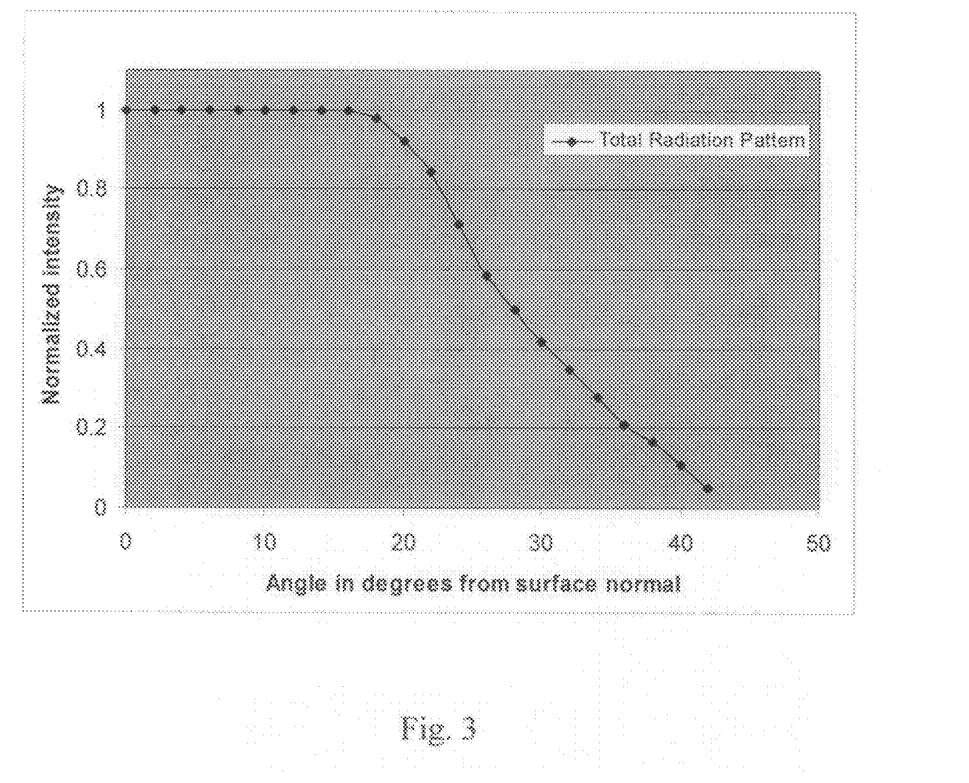
FIG. 3 is graph showing the total radiation pattern of all wavelengths emitted by RCLED used in ray trace model.

In order to test the effective coupling of the RCLED to an optical fiber the radiation pattern used for the device was the sum of the individual wavelength patterns, resulting in a radiation pattern with full width at half maximum (FWHM) half angle of roughly 30 degrees. This model radiation pattern is shown in FIG. 3 which is a graph showing the total radiation pattern of all wavelengths emitted by RCLED used in ray trace model.

While this radiation pattern consists of several wavelengths that would have different contributions to up conversion, it is a good 'worst case' injection pattern for the design of an optical fiber, consisting of the highest numerical aperture (NA) input radiation that a fiber design might see.

A test RCLED source and fiber were constructed in BRO Optical's ASAP raytrace software. The RCLED source was constructed as an approximately 3 μm by 3 μm emitting surface with output apodized to correspond to the angular distribution shown in FIG. 3. This source was then placed a variable distance from the input surface of an approximately 10 cm long test fiber. The core refractive index of the fiber was initially set to approximately 1.5 and cladding to approximately 1.49 with an approximately 125 μm core diameter and approximately 250 μm cladding diameter. The primary numbers of interest when modeling the fiber are the total absorption efficiency of the pump light (the ratio of absorbed power to total optical pump power) and the uniformity ratio (the power absorbed at the output end of the fiber divided by the power absorbed at the input end of the fiber).

Figure 4:
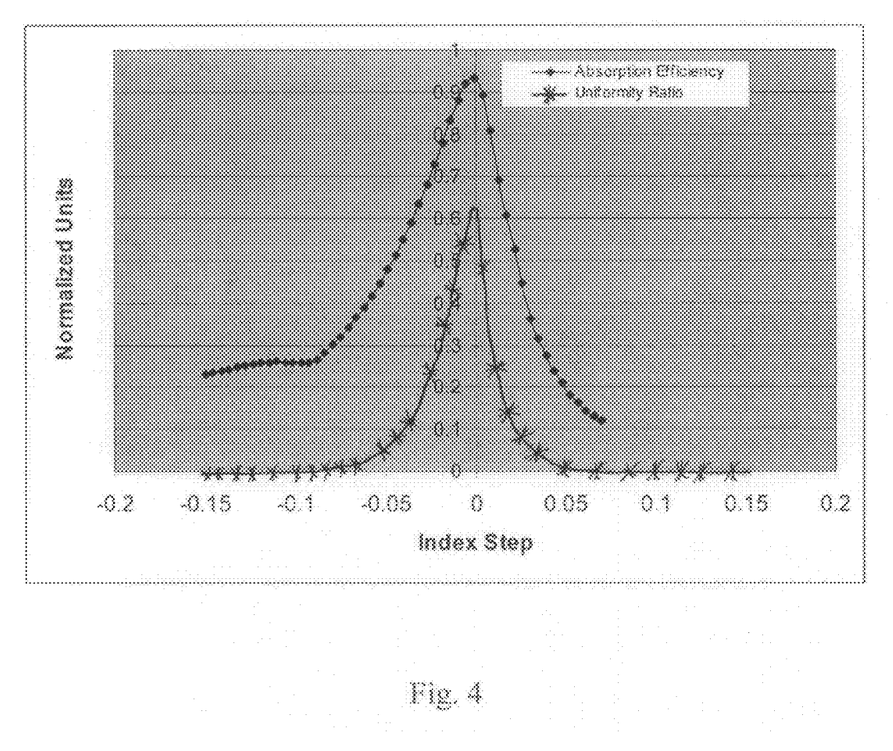
FIG. 4 is a plot of the absorption efficiency and uniformity ratio for 10 cm optical fiber with core refractive index of 1.50, absorption coefficient of 0.1 (1/mm), core diameter of 125 μm and cladding diameter of 250 μm.

First, a simple test was preformed to look at both the absorption efficiency and uniformity in the fiber versus the index step between the fiber core and the external cladding containing the up converters. This was done using the initial core and cladding diameters mentioned above, with the RCLED placed approximately 0.1 mm from the fiber end facet. An absorption coefficient of approximately 0.1 $mm^{-1}$ was used to represent the light absorbed by the up converters placed in the fiber cladding. FIG. 4 shows a plot of both absorption efficiency and uniformity ratio versus index step.

FIG. 4 is a plot showing the absorption efficiency and uniformity ratio for 10 cm optical fiber with core refractive index of 1 approximately 0.50, absorption coefficient of approximately 0.1 (1/mm), core diameter of approximately 125 μm and cladding diameter of approximately 250 μm.

As shown in FIG. 4, both absorption efficiency and uniformity are maximum when the refractive index difference between core and cladding is near zero. Most of the guiding in the fiber in this example is due to the cladding-air interface. The large step difference between cladding and air (approximately 0.5) creates a very large numerical aperture (NA) fiber capable of easily coupling light from almost any source.

$$NA = (n_1^2 - n_2^2)^{1/2} = \sqrt{1.5^2 - 1} = 1.12 \quad (1)$$

$$\alpha_{max} = \sin^{-1}\left(\frac{NA}{n_{air}}\right) = \sin^{-1}(1.12) = \text{undefined} \quad (2)$$

The numerical aperture of the fiber is determined to be greater then 1, resulting in a maximum acceptance angle of the fiber, $\alpha_{max}$, of greater then 90 degrees. This means that all light incident on the end of the fiber will couple into the fiber, with only Fresnel reflection limiting the amount of power from the incident source light that will enter the fiber.

With the knowledge that the optical index difference between core and clad is zero, the next major question to answer is how thick should the doped cladding be in order to maximized absorbed power along the length of the fiber while maintaining uniformity along the fiber length. Using a measured absorption coefficient from the green up converter of 1.46 $mm^{-1}$ additional simulations were carried out looking at the absorption efficiency and uniformity ratio of the power deposited in the fiber cladding versus the cladding thickness for a fiber with approximately 300 μm total diameter.

Figure 5:
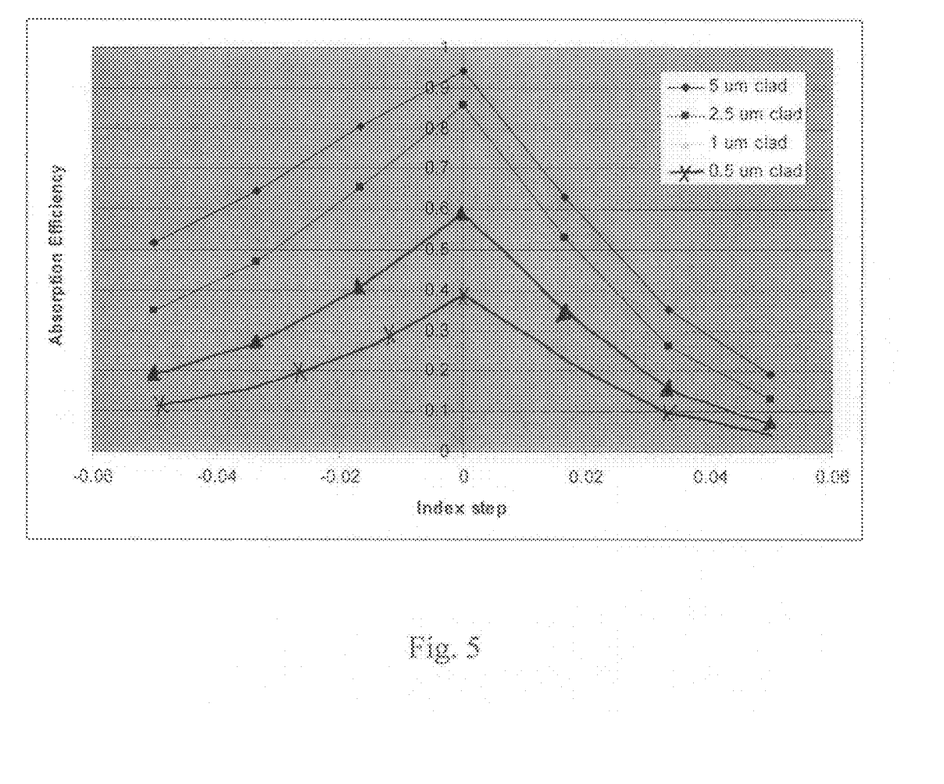
FIG. 5 is graph showing the absorption efficiency of a doped cladding fiber plotted versus the index step between core and cladding for multiple values of cladding thickness.
Figure 6:
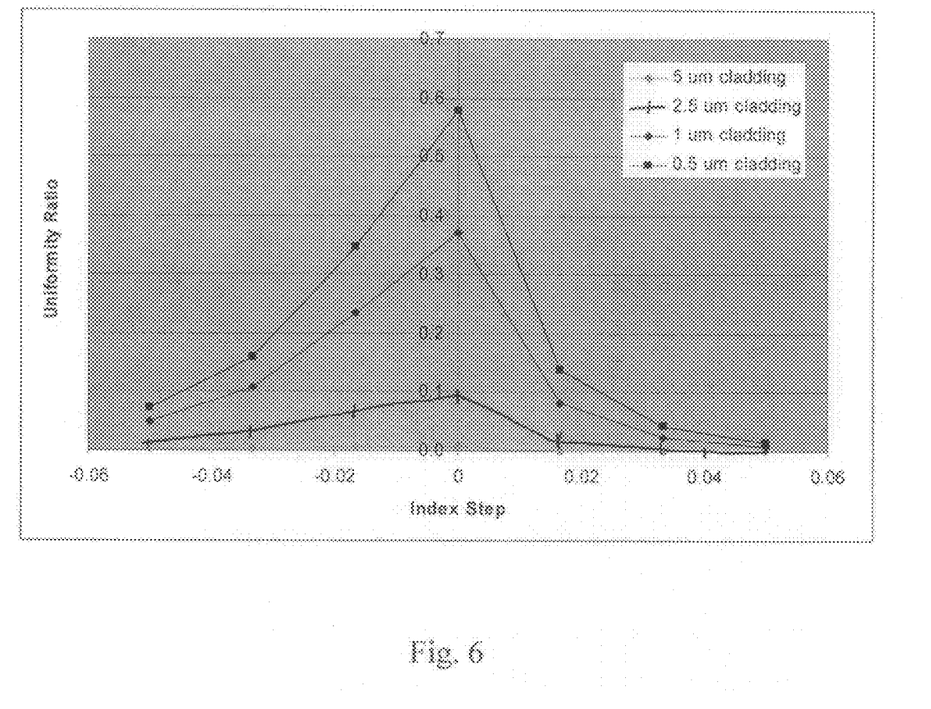
FIG. 6 is graph showing the uniformity ratio of a doped cladding fiber plotted versus the index step between core and cladding for multiple values of cladding thickness.

FIG. 5 shows the absorption efficiency (defined as the total power absorbed in the fiber divided by the total optical power emitted by the RCLED source) of a doped cladding fiber with absorption coefficient of approximately 1.46 (1/mm), core refractive index of approximately 1.50, and total diameter of approximately 300 μm plotted versus the index step between core and cladding for multiple values of cladding thickness. As shown in FIG. 5, the simulation result from calculating absorption efficiency versus the index step between core and cladding for cladding thicknesses ranging from approximately 5 μm to approximately 0.5 μm. FIG. 6 similarly shows the simulation result from modeling the uniformity ratio when varying the index step between core and cladding while utilizing a cladding thicknesses ranging from approximately 5 μm to approximately 0.5 μm. These plots clearly show that a core and cladding with near zero index difference results in the best absorption efficiency and uniformity.

FIG. 6 shows the uniformity ratio (defined as the absorbed power at the fiber exit divided by the absorbed power at the fiber entrance) of a doped cladding fiber with absorption coefficient 1.46 (1/mm), core refractive index of approximately 1.50, and total diameter of approximately 300 μm plotted versus the index step between core and cladding for multiple values of cladding thickness.

Figure 7:
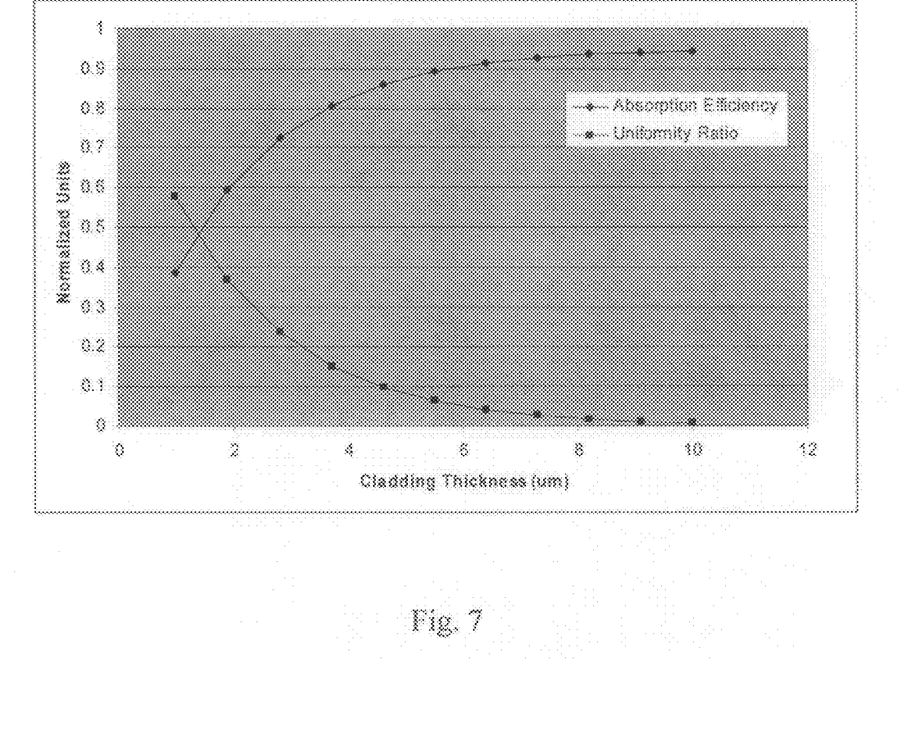
FIG. 7 is graph showing the absorption efficiency and uniformity ratio plotted versus cladding thickness.

Since both absorption efficiency and uniformity are peaked with near zero index difference between core and cladding, the two can be plotted together versus the cladding thickness in order to determine a cladding thickness that will provide the best balance of absorption and uniformity, this is shown in FIG. 7. This plot can be used to determine an acceptable tradeoff between absorption uniformity along the fiber length and total efficiency of absorption in the fiber. A balance between uniformity and absorption appears to exist for a cladding thickness of approximately 1.5 μm. This thickness corresponds to a cladding thickness that is approximately 0.0022 times the characteristic absorption length in the cladding ($1/\alpha$).

One method to increase the uniformity of absorption in the fiber is to reflectively coat the exit facet of the fiber. This will give the pump light a double pass through the fiber, increasing the amount of absorbed pump power at the far end of the fiber and increasing the total absorption efficiency as well. Absorption efficiency and uniformity for a fiber with an end mirror are shown in FIG. 8.

Figure 8:
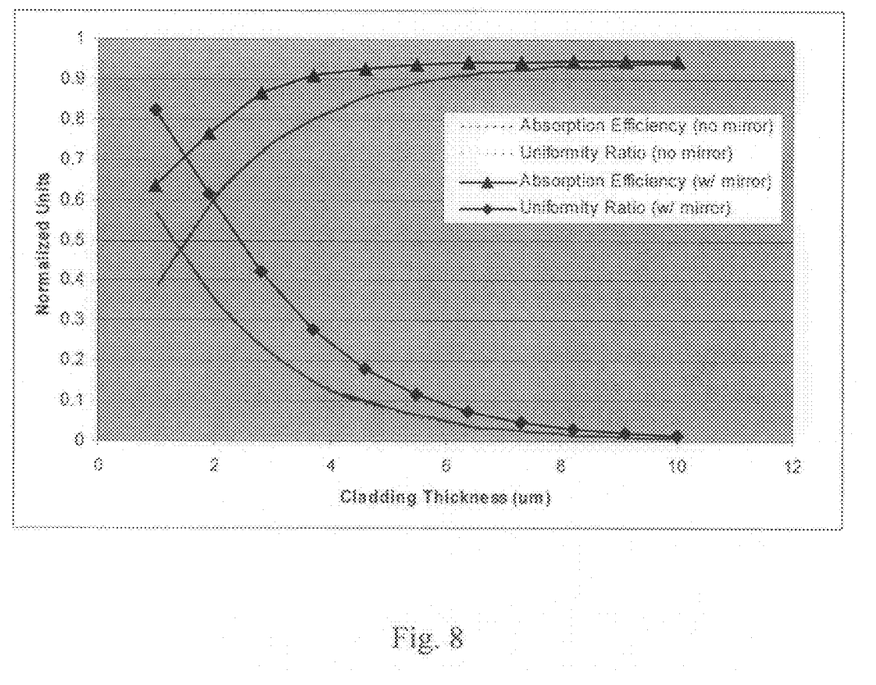
FIG. 8 is graph showing the absorption efficiency and uniformity ratio plotted versus cladding thickness for a fiber with and without mirrored end coat.

FIG. 8 shows the absorption efficiency and uniformity ratio plotted versus cladding thickness for a fiber with and without mirrored end coat. The end mirror dramatically increases the uniformity of absorption along the length of the fiber as well as the overall absorption efficiency.

Finally, the previous simulations have looked at the absorption and uniformity based on the absorption coefficient of the up converter material itself. However, this up converter material will be spread throughout an optically clear cladding material. Thus, the relative fill ratio of the cladding (volume of cladding/volume of contained up converter) will alter the effective absorption coefficient, $\alpha$, of the up converting cladding material. Since $\alpha$ is equal to the number density of absorbers times the absorption cross section, the effective $\alpha$ of the cladding will change relative to the effective number density of absorbers, meaning that $\alpha$ for the cladding will vary directly as the fill ratio of up converters in the cladding (i.e. a cladding that consists of an equal volume up converters and inert clad material will have an absorption coefficient ½ that of the up converter material by itself).

Ray trace simulation was done looking at absorption efficiency and uniformity verses cladding thickness and the up converter fill ratio of the cladding. The results show that, for thin cladding and/or low fill ratio resulting in an absorption length in the cladding that is well less than the actual cladding thickness, the absorption efficiency and uniformity ratio are directly related to the product of the cladding thickness and the cladding fill ratio. Thus, a cladding consisting of 100% up converter will have the same absorption efficiency and uniformity as a cladding consisting of approximately 50% up converter with twice the thickness. Example data is shown in Table 1.

| Cladding thickness (m) | Fill Ratio | Product | Abs Efficiency | Uniformity |
| --- | --- | --- | --- | --- |
| 1 | 1 | 1 | 0.38 | 0.58 |
| 1.9 | 0.5 | 0.95 | 0.37 | 0.59 |
| 10 | 0.1 | 1 | 0.38 | 0.57 |
| 1.9 | 1 | 1.9 | 0.59 | 0.37 |
| 10 | 0.2 | 2 | 0.61 | 0.35 |

Table 1 is a table of pairing of cladding thickness and fill ratio with similar products showing that a constant ratio of cladding thickness to cladding fill ratio provides invariant absorption efficiency and uniformity along the fiber length. This ability to scale the cladding thickness with fill ratio of up converters allows us to generalize the results found for specific cladding thickness and absorption coefficients. With this general guide, a proper cladding thickness can be determined for any index matched, up converter doped cladding, so long as the effective absorption length in the cladding is significantly smaller then the cladding thickness.

One preferred design is one in which the core of the fiber is glass or quartz so that it easily transmits the near infrared light from the GaAs semiconductor light source along its length while the cladding is a polymer material into which the up converting particles have been placed and into which the near infrared light leaks as it propagates in the core. As the near infrared light leaks into the cladding it excites the up converters to emit visible light continuously along the length of the fiber. This design can use either index anti guided or index guided core-cladding combinations. To assure uniform visible light emission along the length of fiber of interest it may be necessary to vary the density of up converters along the length since the near infrared light power will decrease as it propagates along the fiber exciting up converters along the way.

Another preferred design is one in which a material such as a polymer or other suitable host material that does not absorb the light from the GaAs semiconductor light source is prepared containing up converting particles and made into a fiber of appropriate thickness with no specific core and into which infrared light from GaAs semiconductor light sources is introduced to excite visible emission from the up converters. The fiber material to air interface will act to keep light traveling parallel or nearly parallel to the fiber axis in the fiber while allowing most of the visible light to exit and be observed. As appropriate, a layer of polymer with no up converting material of the same or different polymer may be placed on the outside of the aforementioned fiber.

Yet another preferred embodiment of use of the emissive fiber is when placed in contact with reflective material such as used in reflective safety tape. The emissive fibers on the reflective safety tape add an emissive feature to the otherwise passive nature of the reflective tape. The fibers can be cycled on and off by cycling the semiconductor light source on and off thus allowing for more noticeable displays and for flashing messages.

Another strong advantage of this concept is the fact that it operates using GaAs semiconductor light sources which means that it can operate with power supply of less than 1.5V or with a single standard battery (e.g., a AAA battery) which makes its use in clothing much more practical than other nitride LED based illuminated cloth that depend on 4 V or more battery packs.

FIG. 1 shows the color gamuts of solid-state up-converters plotted with NTSC/HDTV standard and OLED display from one of the leading manufacturers specializing in headset products (eMagin). The up converters, based on rare earth doped fluorides, emit at the points on the diagram boundary and so are one of very few light sources that can reach or exceed the NTSC color standard. This establishes the up converter-resonant cavity light emitting diode display's ability to fully reproduce almost all of the real life color spectrum as sensed by the human eye.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of producing an emissive fiber capable of being used for making emissive fabric comprising the step of:
    providing an optical fiber having a core and a cladding surrounding the core, the core index of refraction for near infrared light that is greater than the refractive index of the cladding for near infrared light as an index guided fiber; and
    embedding an up conversion particles into at least one of the cladding and the core of the optical fiber to produce an emissive fiber that emits visible light when excited by light from near infrared light source that excites the up conversion particles to emit the visible light along a length of the optical fiber.

2. The method of claim 1 further comprising the step of:
    selecting an index difference between the core and the cladding that is approximately zero.

3. The method of claim 1 further comprising the step of:
    selecting the optical fiber to have a refractive index difference between the cladding and air of approximately 0.5 for a numerical aperture fiber capable of coupling light.

4. The method of claim 1 wherein the optical fiber comprises:
    providing a glass core; and
    embedding the up conversion particles in a polymer; and
    cladding the glass core with the polymeric cladding.

5. The method of claim 4 wherein the embedding step comprises the step of:
    embedding the up conversion particles at different locations along the length of the optical fiber cladding.

6. The method of claim 4 wherein the embedding step comprises the step of:
    embedding up conversion particles to emit a different colors of visible light along the length of the optical fiber cladding.

7. The method of claim 4 wherein the embedding step comprises the steps of:
    mixing one or more of a red, a green and a blue up conversion particles; and
    embedding the mixed up conversion particles to emit a selected color of visible light.

8. The method of claim 1 wherein the embedding step comprises the step of:
    embedding the up conversion particles into the core of the optical fiber.

9. The method of claim 1 wherein the incorporating step comprises the step of:
    embedding the up conversion particles into the cladding of the optical fiber.

10. The method of claim 1 further comprising the step of:
    exciting the up conversion particles with a GaAs based semiconductor light source.

11. The method of claim 1 further comprising the step of:
    exciting the up conversion particles with a resonant cavity light emitting diode.

12. The method of claim 1 further comprising the step of:
    varying a thickness of the cladding of the optical fiber to control the absorbed power along the length of the optical fiber.

13. An emissive fabric comprising:
    plural optical fibers each having a cladding and a core, the core index of refraction for near infrared light being less than the refractive index of the cladding for near infrared light as an index anti-guided fiber; and
    up conversion particles embedded into at least one of the cladding and a core of the plural optical fibers to form an emissive fiber, the plural optical fibers intertwined to produce an emissive fabric, wherein coupling a light source with the emissive fibers transmits a light beam through the fiber to excite the up conversion particles to emit visible light.

14. The fabric of claim 13 wherein the up conversion material is embedded into the core of the emissive fiber.

15. The fabric of claim 13 wherein the up conversion material is incorporated into the cladding of the emissive fiber.

16. The fabric of claim 13 wherein the up conversion particles comprises:
    at least one of a red, green and a blue up conversion material.

17. The fabric of claim 16 wherein different up conversion materials are embedded into different sections along the length of the optical fiber to use in forming an emissive material to produce different colors in different parts of the emissive fabric.

18. The fiber of claim 16, wherein the red up conversion particles comprise:
    approximately 1% Er and approximately 18% $Yb:YF_3$ for an efficient red light emitter.

19. The device of claim 16, wherein the green up conversion particles comprises:
    approximately 1% Er and approximately 18% $Yb:NaYF_4$ produces green light.

20. The device of claim 16, wherein the blue up conversion particles comprises:
    approximately 0.4% Tm and approximately 20% $Yb:KY_3F_{10}$ to emits blue light.

21. A system to illuminate an emissive fabric comprising:
    plural optical fibers each having a cladding and a core, the core index of refraction for near infrared light being greater than the refractive index of the cladding for near infrared light as an index guided fiber;
    an up conversion material embedded into at least one of the cladding and the core of the plural optical fibers forming an emissive fiber; and light source coupled with the plural optical fibers for producing a light beam, the light beam transmitted through the plural emissive optical fibers.

22. A method of producing an emissive fiber capable of being used for making emissive fabric comprising the step of:
provding an optical fiber having a core and a cladding surrounding the core, the core index of refraction for near infrared light being less than the refractive index of the cladding for near infrared light as an index anti-guided fiber; and
embedding an up conversion particles into at least one of the cladding and the core of the optical fiber to produce an emissive fiber that emits visible light when excited by light from near infrared light source that excites the up conversion particles to emit the visible light along a length of the optical fiber.

23. The method of claim 22 further comprising the step of:
selecting an index difference between the core and the cladding that is approximately zero.

24. The method of claim 22 further comprising the step of:
selecting the optical fiber to have a refractive index difference between the cladding and air of approximately 0.5 for a numerical aperture fiber capable of coupling light.

25. The method of claim 22 wherein the optical fiber comprises:
providing a glass core; and
embedding the up conversion particles in a polymer; and
cladding the glass core with the polymeric cladding.

26. The method of claim 25 wherein the embedding step comprises the step of:
embedding the up conversion particles at different locations along the length of the optical fiber cladding.

27. The method of claim 25 wherein the embedding step comprises the step of:
embedding up conversion particles to emit a different colors of visible light along the length of the optical fiber cladding.

28. The method of claim 25 wherein the embedding step comprises the steps of:
mixing one or more of a red, a green and a blue up conversion particles; and
embedding the mixed up conversion particles to emit a selected color of visible light.

29. The method of claim 22 wherein the embedding step comprises the step of:
embedding the up conversion particles into the core of the optical fiber.

30. The method of claim 22 wherein the incorporating step comprises the step of:
embedding the up conversion particles into the cladding of the optical fiber.

31. The method of claim 22 further comprising the step of:
exciting the up conversion particles with a GaAs based semiconductor light source.

32. The method of claim 22 further comprising the step of:
exciting the up conversion particles with a resonant cavity light emitting diode.

33. The method of claim 22 further comprising the step of:
varying a thickness of the cladding of the optical fiber to control the absorbed power along the length of the optical fiber.

* * * * *

UNITED STATES PATENT AND TRADEMARK OFFICE
CERTIFICATE OF CORRECTION

| | | |
|---|---|---|
| PATENT NO. | : 8,419,189 B1 | Page 1 of 1 |
| APPLICATION NO. | : 12/784594 | |
| DATED | : April 16, 2013 | |
| INVENTOR(S) | : Dennis G. Deppe et al. | |

It is certified that error appears in the above-identified patent and that said Letters Patent is hereby corrected as shown below:

In the Specifications:

Column 1, Line 18, insert:

--STATEMENT REGARDING FEDERALLY SPONSORED RESEARCH OR DEVELOPMENT

This invention was funded in part by NSF, grant number IIP-0839588.--

Signed and Sealed this
Twenty-eighth Day of May, 2013

Teresa Stanek Rea
*Acting Director of the United States Patent and Trademark Office*